(12) United States Patent
Banerjee et al.

(10) Patent No.: US 10,079,761 B2
(45) Date of Patent: Sep. 18, 2018

(54) HIERARCHICAL ROUTING WITH TABLE MANAGEMENT ACROSS HARDWARE MODULES

(71) Applicant: Cisco Technology, Inc., San Jose, CA (US)

(72) Inventors: Ayan Banerjee, Fremont, CA (US); Ramana Mellacheruvu, Cupertino, CA (US); Abhishek Saxena, San Jose, CA (US); Vishal Jain, San Jose, CA (US); Luca Cafiero, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/477,753

(22) Filed: Sep. 4, 2014

(65) Prior Publication Data

US 2015/0124806 A1 May 7, 2015

Related U.S. Application Data (60) Provisional application No. 61/900,353, filed on Nov. 5, 2013.

(51) Int. Cl.
| | |
|---|---|
| *H04L 12/741* | (2013.01) |
| *H04L 12/58* | (2006.01) |
| *H04W 28/12* | (2009.01) |
| *H04W 72/00* | (2009.01) |
| *H04L 12/721* | (2013.01) |
| *H04L 12/801* | (2013.01) |

(Continued)

(52) U.S. Cl.
CPC ............ *H04L 45/745* (2013.01); *H04L 45/16* (2013.01); *H04L 45/72* (2013.01); *H04L 45/748* (2013.01); *H04L 47/33* (2013.01); *H04L 51/10* (2013.01); *H04W 28/12* (2013.01); *H04W 72/005* (2013.01)

(58) Field of Classification Search
CPC ....... H04L 45/70; H04L 45/72; H04L 45/745; H04L 45/7453; H04L 45/16; H04L 45/54; H04L 45/748; H04L 47/33; H04L 51/10; H04W 28/12

See application file for complete search history.

(56) References Cited

U.S. PATENT DOCUMENTS

| | | | |
|---|---|---|---|
| 4,298,770 | A | 11/1981 | Nishihara et al. |
| 4,636,919 | A | 1/1987 | Itakura et al. |

(Continued)

FOREIGN PATENT DOCUMENTS

| | | |
|---|---|---|
| WO | 2002052442 A1 | 7/2002 |
| WO | WO 2014/071996 | 5/2014 |

OTHER PUBLICATIONS

International Search Report and Written Opinions for PCT/US2014/063577 dated Jan. 30, 2015.

(Continued)

*Primary Examiner* — Habte Mered
(74) *Attorney, Agent, or Firm* — Polsinelli (57) ABSTRACT

Systems, methods, and non-transitory computer-readable storage media for performing hierarchical routing are disclosed. The method includes identifying routes in a computer network and arranging those routes in two separate routing tables. The first routing table is stored on a first module and the second routing table is stored on a second module.

18 Claims, 7 Drawing Sheets (51) Int. Cl.
*H04L 12/761* (2013.01)
*H04L 12/745* (2013.01)

(56) References Cited

U.S. PATENT DOCUMENTS

| | | | |
|---|---|---|---|
| 4,700,016 A | 10/1987 | Hitchcock et al. | |
| 5,115,431 A | 5/1992 | Williams et al. | |
| 5,859,835 A | 1/1999 | Varma et al. | |
| 5,926,458 A | 7/1999 | Yin et al. | |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,735,198 B1 | 5/2004 | Edsall et al. | |
| 6,757,897 B1 | 6/2004 | Shi et al. | |
| 6,876,952 B1 | 4/2005 | Kappler et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1* | 10/2005 | Ma | H04L 45/00 370/392 |
| 6,996,099 B1 | 2/2006 | Kadambi et al. | |
| 7,068,667 B2 | 6/2006 | Foster et al. | |
| 7,152,117 B1 | 12/2006 | Stapp et al. | |
| 7,177,946 B1 | 2/2007 | Kaluve et al. | |
| 7,313,666 B1 | 12/2007 | Saminda De Silva et al. | |
| 7,372,857 B1 | 5/2008 | Kappler et al. | |
| 7,411,915 B1 | 8/2008 | Spain et al. | |
| 7,426,604 B1 | 9/2008 | Rygh et al. | |
| 7,516,211 B1 | 4/2009 | Gourlay et al. | |
| 7,539,131 B2 | 5/2009 | Shen | |
| 7,580,409 B1 | 8/2009 | Swenson et al. | |
| 7,630,368 B2 | 12/2009 | Tripathi et al. | |
| 7,729,296 B1 | 6/2010 | Choudhary | |
| 7,826,469 B1 | 11/2010 | Li et al. | |
| 8,233,384 B2 | 7/2012 | Osterhout et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,378,223 B1 | 2/2013 | Shiue et al. | |
| 8,442,063 B1 | 5/2013 | Zhou et al. | |
| 8,514,712 B1 | 8/2013 | Aswadhati | |
| 8,687,629 B1* | 4/2014 | Kompella | H04L 49/1515 370/386 |
| 8,868,766 B1 | 10/2014 | Theimer et al. | |
| 8,908,691 B2 | 12/2014 | Biswas et al. | |
| 9,036,481 B1 | 5/2015 | White | |
| 9,106,508 B2 | 8/2015 | Banavalikar et al. | |
| 9,178,715 B2 | 11/2015 | Jain et al. | |
| 9,197,551 B2 | 11/2015 | DeCusatis et al. | |
| 9,203,188 B1 | 12/2015 | Siechen et al. | |
| 9,258,195 B1 | 2/2016 | Pendleton et al. | |
| 9,325,524 B2 | 4/2016 | Banavalikar et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,426,060 B2 | 8/2016 | Dixon et al. | |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,185 B1 | 1/2017 | Yadav et al. | |
| 9,544,224 B2 | 1/2017 | Chu et al. | |
| 9,590,914 B2 | 3/2017 | Attar et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,716,665 B2 | 7/2017 | Attar et al. | |
| 9,742,673 B2 | 8/2017 | Banerjee et al. | |
| 9,755,965 B1 | 9/2017 | Yadav et al. | |
| 9,769,078 B2 | 9/2017 | Attar et al. | |
| 9,876,715 B2 | 1/2018 | Edsall et al. | |
| 2002/0126671 A1 | 9/2002 | Ellis et al. | |
| 2002/0136268 A1 | 9/2002 | Gan et al. | |
| 2002/0146026 A1 | 10/2002 | Unitt et al. | |
| 2003/0035385 A1 | 2/2003 | Walsh et al. | |
| 2003/0058837 A1 | 3/2003 | Denney et al. | |
| 2003/0058860 A1 | 3/2003 | Kunze et al. | |
| 2003/0067924 A1* | 4/2003 | Choe | H04L 45/02 370/400 |
| 2003/0097461 A1 | 5/2003 | Barham et al. | |
| 2003/0115319 A1 | 6/2003 | Dawson et al. | |
| 2003/0137940 A1 | 7/2003 | Schwartz et al. | |
| 2003/0142629 A1 | 7/2003 | Krishnamurthi et al. | |
| 2003/0174650 A1 | 9/2003 | Shankar et al. | |
| 2003/0223376 A1 | 12/2003 | Elliott et al. | |
| 2003/0231646 A1 | 12/2003 | Chandra et al. | |
| 2004/0062259 A1 | 4/2004 | Jeffries et al. | |
| 2004/0073715 A1 | 4/2004 | Folkes et al. | |
| 2004/0100901 A1 | 5/2004 | Bellows | |
| 2004/0103310 A1 | 5/2004 | Sobel et al. | |
| 2004/0111507 A1 | 6/2004 | Villado et al. | |
| 2004/0160956 A1 | 8/2004 | Hardy et al. | |
| 2004/0249960 A1 | 12/2004 | Hardy et al. | |
| 2005/0007961 A1 | 1/2005 | Scott et al. | |
| 2005/0013280 A1 | 1/2005 | Buddhikot et al. | |
| 2005/0073958 A1 | 4/2005 | Atlas et al. | |
| 2005/0091239 A1 | 4/2005 | Ward et al. | |
| 2005/0105524 A1 | 5/2005 | Stevens et al. | |
| 2005/0141517 A1 | 6/2005 | Choi et al. | |
| 2005/0175020 A1 | 8/2005 | Park et al. | |
| 2005/0201375 A1 | 9/2005 | Komatsu et al. | |
| 2005/0207410 A1 | 9/2005 | Adhikari et al. | |
| 2005/0213504 A1 | 9/2005 | Enomoto et al. | |
| 2005/0232227 A1 | 10/2005 | Jorgenson et al. | |
| 2006/0028285 A1 | 2/2006 | Jang et al. | |
| 2006/0031643 A1 | 2/2006 | Figueira | |
| 2006/0075093 A1 | 4/2006 | Frattura et al. | |
| 2006/0083179 A1 | 4/2006 | Mitchell | |
| 2006/0083256 A1 | 4/2006 | Mitchell | |
| 2006/0182036 A1 | 8/2006 | Sasagawa et al. | |
| 2006/0198315 A1 | 9/2006 | Sasagawa et al. | |
| 2006/0209688 A1 | 9/2006 | Tsuge et al. | |
| 2006/0209702 A1 | 9/2006 | Schmitt et al. | |
| 2006/0215572 A1 | 9/2006 | Padhye et al. | |
| 2006/0215623 A1 | 9/2006 | Lin et al. | |
| 2006/0221835 A1 | 10/2006 | Sweeney | |
| 2006/0239204 A1 | 10/2006 | Bordonaro et al. | |
| 2006/0250982 A1 | 11/2006 | Yuan et al. | |
| 2006/0268742 A1 | 11/2006 | Chu et al. | |
| 2006/0274657 A1 | 12/2006 | Olgaard et al. | |
| 2006/0280179 A1 | 12/2006 | Meier | |
| 2006/0285500 A1 | 12/2006 | Booth, III et al. | |
| 2007/0016590 A1 | 1/2007 | Appleby et al. | |
| 2007/0025241 A1 | 2/2007 | Nadeau et al. | |
| 2007/0053303 A1 | 3/2007 | Kryuchkov | |
| 2007/0058557 A1 | 3/2007 | Cuffaro et al. | |
| 2007/0061451 A1 | 3/2007 | Villado et al. | |
| 2007/0076605 A1 | 4/2007 | Cidon et al. | |
| 2007/0091795 A1 | 4/2007 | Bonaventure et al. | |
| 2007/0097872 A1 | 5/2007 | Chiu | |
| 2007/0159987 A1 | 7/2007 | Khan et al. | |
| 2007/0160073 A1 | 7/2007 | Toumura et al. | |
| 2007/0211625 A1 | 9/2007 | Liu et al. | |
| 2007/0223372 A1 | 9/2007 | Haalen et al. | |
| 2007/0233847 A1 | 10/2007 | Aldereguia et al. | |
| 2007/0258382 A1 | 11/2007 | Foll et al. | |
| 2007/0258383 A1 | 11/2007 | Wada | |
| 2007/0274229 A1 | 11/2007 | Scholl et al. | |
| 2007/0280264 A1 | 12/2007 | Milton et al. | |
| 2008/0031130 A1 | 2/2008 | Raj et al. | |
| 2008/0031146 A1 | 2/2008 | Kwak et al. | |
| 2008/0031247 A1 | 2/2008 | Tahara et al. | |
| 2008/0092213 A1 | 4/2008 | Wei et al. | |
| 2008/0130601 A1 | 6/2008 | Kim et al. | |
| 2008/0147830 A1 | 6/2008 | Ridgill et al. | |

(56) References Cited

U.S. PATENT DOCUMENTS

| | | | |
|---|---|---|---|
| 2008/0151863 A1* | 6/2008 | Lawrence | H04L 49/15 370/351 |
| 2008/0177896 A1 | 7/2008 | Quinn et al. | |
| 2008/0219173 A1 | 9/2008 | Yoshida et al. | |
| 2008/0225853 A1 | 9/2008 | Melman et al. | |
| 2008/0259809 A1 | 10/2008 | Stephan et al. | |
| 2008/0259925 A1 | 10/2008 | Droms et al. | |
| 2008/0310421 A1 | 12/2008 | Teisberg et al. | |
| 2009/0052332 A1 | 2/2009 | Fukuyama et al. | |
| 2009/0094357 A1 | 4/2009 | Keohane et al. | |
| 2009/0103566 A1 | 4/2009 | Kloth et al. | |
| 2009/0116402 A1 | 5/2009 | Yamasaki | |
| 2009/0122805 A1 | 5/2009 | Epps et al. | |
| 2009/0154459 A1 | 6/2009 | Husak et al. | |
| 2009/0188711 A1 | 7/2009 | Ahmad | |
| 2009/0193103 A1 | 7/2009 | Small et al. | |
| 2009/0225671 A1 | 9/2009 | Arbel et al. | |
| 2009/0232011 A1 | 9/2009 | Li et al. | |
| 2009/0268614 A1 | 10/2009 | Tay et al. | |
| 2009/0271508 A1 | 10/2009 | Sommers et al. | |
| 2010/0128619 A1 | 5/2010 | Shigei | |
| 2010/0150155 A1* | 6/2010 | Napierala | H04L 45/00 370/390 |
| 2010/0189080 A1 | 7/2010 | Hu et al. | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0260197 A1 | 10/2010 | Martin et al. | |
| 2010/0287227 A1 | 11/2010 | Goel et al. | |
| 2010/0299553 A1 | 11/2010 | Cen | |
| 2010/0312875 A1 | 12/2010 | Wilerson et al. | |
| 2011/0038375 A1 | 2/2011 | Liu et al. | |
| 2011/0110241 A1 | 5/2011 | Atkinson et al. | |
| 2011/0122889 A1 | 5/2011 | Pacella et al. | |
| 2011/0138310 A1 | 6/2011 | Gomez et al. | |
| 2011/0158248 A1 | 6/2011 | Vorunganti et al. | |
| 2011/0170426 A1 | 7/2011 | Kompella et al. | |
| 2011/0203834 A1 | 8/2011 | Yoneya et al. | |
| 2011/0228795 A1 | 9/2011 | Agrawal et al. | |
| 2011/0249682 A1* | 10/2011 | Kean | H04L 45/00 370/401 |
| 2011/0268118 A1 | 11/2011 | Schlansker et al. | |
| 2011/0286447 A1 | 11/2011 | Liu | |
| 2011/0299406 A1 | 12/2011 | Vobbilisetty et al. | |
| 2011/0307656 A1 | 12/2011 | Hamdi et al. | |
| 2011/0310738 A1 | 12/2011 | Lee et al. | |
| 2011/0321031 A1 | 12/2011 | Dournov et al. | |
| 2012/0007688 A1 | 1/2012 | Zhou et al. | |
| 2012/0063318 A1 | 3/2012 | Boddu et al. | |
| 2012/0102114 A1 | 4/2012 | Dunn et al. | |
| 2012/0147752 A1 | 6/2012 | Ashwood-Smith et al. | |
| 2012/0163396 A1 | 6/2012 | Cheng et al. | |
| 2012/0195233 A1 | 8/2012 | Wang et al. | |
| 2012/0275304 A1 | 11/2012 | Patel et al. | |
| 2012/0281697 A1 | 11/2012 | Huang | |
| 2012/0300787 A1 | 11/2012 | Korger | |
| 2012/0314581 A1 | 12/2012 | Rajamanickam et al. | |
| 2013/0055155 A1 | 2/2013 | Wong et al. | |
| 2013/0090014 A1 | 4/2013 | Champion | |
| 2013/0097335 A1 | 4/2013 | Jiang et al. | |
| 2013/0124708 A1 | 5/2013 | Lee et al. | |
| 2013/0182712 A1 | 7/2013 | Aguayo et al. | |
| 2013/0227108 A1 | 8/2013 | Dunbar et al. | |
| 2013/0250951 A1 | 9/2013 | Koganti | |
| 2013/0311663 A1 | 11/2013 | Kamath et al. | |
| 2013/0311991 A1 | 11/2013 | Li et al. | |
| 2013/0322258 A1 | 12/2013 | Nedeltchev et al. | |
| 2013/0322446 A1 | 12/2013 | Biswas et al. | |
| 2013/0322453 A1 | 12/2013 | Allan | |
| 2013/0332399 A1 | 12/2013 | Reddy et al. | |
| 2013/0332577 A1 | 12/2013 | Nakil et al. | |
| 2013/0332602 A1 | 12/2013 | Nakil et al. | |
| 2014/0006549 A1 | 1/2014 | Narayanaswamy et al. | |
| 2014/0016501 A1 | 1/2014 | Kamath et al. | |
| 2014/0043535 A1 | 2/2014 | Motoyama et al. | |
| 2014/0043972 A1 | 2/2014 | Li et al. | |
| 2014/0047264 A1 | 2/2014 | Wang et al. | |
| 2014/0050223 A1 | 2/2014 | Foo et al. | |
| 2014/0056298 A1 | 2/2014 | Vobbilisetty et al. | |
| 2014/0064281 A1 | 3/2014 | Basso et al. | |
| 2014/0068750 A1 | 3/2014 | Tjahjono et al. | |
| 2014/0086253 A1 | 3/2014 | Yong et al. | |
| 2014/0105039 A1 | 4/2014 | Mcdysan | |
| 2014/0105062 A1 | 4/2014 | Mcdysan et al. | |
| 2014/0105216 A1 | 4/2014 | Mcdysan | |
| 2014/0146817 A1 | 5/2014 | Zhang | |
| 2014/0146824 A1* | 5/2014 | Angst | H04L 12/4675 370/401 |
| 2014/0201375 A1 | 7/2014 | Beereddy et al. | |
| 2014/0219275 A1 | 8/2014 | Allan et al. | |
| 2014/0241353 A1 | 8/2014 | Zhang et al. | |
| 2014/0244779 A1 | 8/2014 | Roitshtein et al. | |
| 2014/0269705 A1 | 9/2014 | DeCusatis et al. | |
| 2014/0269712 A1 | 9/2014 | Kidambi | |
| 2014/0307744 A1 | 10/2014 | Dunbar et al. | |
| 2014/0321277 A1 | 10/2014 | Lynn, Jr. et al. | |
| 2014/0328206 A1 | 11/2014 | Chan et al. | |
| 2014/0334295 A1 | 11/2014 | Guichard et al. | |
| 2014/0341029 A1 | 11/2014 | Allan et al. | |
| 2014/0372582 A1 | 12/2014 | Ghanwani et al. | |
| 2015/0009992 A1 | 1/2015 | Zhang | |
| 2015/0010001 A1 | 1/2015 | Duda et al. | |
| 2015/0092551 A1 | 4/2015 | Moisand et al. | |
| 2015/0092591 A1 | 4/2015 | Matthews et al. | |
| 2015/0092593 A1 | 4/2015 | Kompella | |
| 2015/0113143 A1 | 4/2015 | Stuart et al. | |
| 2015/0124629 A1 | 5/2015 | Pani | |
| 2015/0124631 A1 | 5/2015 | Edsall et al. | |
| 2015/0124633 A1 | 5/2015 | Banerjee et al. | |
| 2015/0124640 A1 | 5/2015 | Chu et al. | |
| 2015/0124644 A1 | 5/2015 | Pani | |
| 2015/0124684 A1 | 5/2015 | Banerjee et al. | |
| 2015/0124817 A1 | 5/2015 | Merchant et al. | |
| 2015/0124821 A1 | 5/2015 | Chu et al. | |
| 2015/0124823 A1 | 5/2015 | Pani et al. | |
| 2015/0124824 A1 | 5/2015 | Edsall et al. | |
| 2015/0124825 A1 | 5/2015 | Dharmapurikar et al. | |
| 2015/0124833 A1 | 5/2015 | Ma et al. | |
| 2015/0127797 A1 | 5/2015 | Attar et al. | |
| 2015/0236900 A1* | 8/2015 | Chung | H04L 69/02 709/221 |
| 2015/0378712 A1 | 12/2015 | Cameron et al. | |
| 2015/0378969 A1 | 12/2015 | Powell et al. | |
| 2016/0036697 A1 | 2/2016 | DeCusatis et al. | |
| 2016/0119204 A1 | 4/2016 | Murasato et al. | |
| 2016/0315811 A1 | 10/2016 | Yadav et al. | |
| 2017/0085469 A1 | 3/2017 | Chu et al. | |
| 2017/0207961 A1 | 7/2017 | Saxena et al. | |
| 2017/0214619 A1 | 7/2017 | Chu et al. | |
| 2017/0237651 A1 | 8/2017 | Pani | |
| 2017/0237678 A1 | 8/2017 | Ma et al. | |
| 2017/0250912 A1 | 8/2017 | Chu et al. | |
| 2017/0346748 A1 | 11/2017 | Attar et al. | |

OTHER PUBLICATIONS

International Search Report and Written Opinion for PCT/US2014/063252, dated May 5, 2015, 9 pages.

International Search Report and Written Opinion for PCT/US2014/063245, dated Mar. 23, 2015, 11 pages.

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

(56) References Cited

OTHER PUBLICATIONS

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf._org/html/draft-mahalingam-dutt-dcops-vxian-06, Oct. 2013, pp. 1-24.

Moncaster, T., et al., "The Need for Congestion Exposure in the Internet", Oct. 26, 2009, Internet-Draft, pp. 1-22.

Narten, T., et al., "Problem Statement: Overlays for Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

\* cited by examiner

| LOCATION | MODULE #1 ROUTE ENTRIES | MODULE #2 ROUTE ENTRIES |
|---|---|---|
| 1 | A | H |
| 2 | B | I |
| 3 | C | J |
| 4 | D | K |
| 5 | E | L |
| 6 | F | M |
| 7 | G | N |
| 8 | H | O |
| 9 | I | P |
| 10 | J | Q |

FIG. 6B

| LOCATION | MODULE #1 ROUTE ENTRIES | MODULE #2 ROUTE ENTRIES |
|---|---|---|
| 1 | A | H |
| 2 | B | I |
| 3 | B' | J |
| 4 | C | K |
| 5 | D | L |
| 6 | E | M |
| 7 | F | N |
| 8 | G | O |
| 9 | H | P |
| 10 | I | Q |

FIG. 6C

| LOCATION | MODULE #1 ROUTE ENTRIES | MODULE #2 ROUTE ENTRIES |
|---|---|---|
| 1 | A | G |
| 2 | B | H |
| 3 | B' | I |
| 4 | C | J |
| 5 | D | K |
| 6 | E | L |
| 7 | F | M |
| 8 | G | N |
| 9 | H | O |
| 10 | I | P |

# HIERARCHICAL ROUTING WITH TABLE MANAGEMENT ACROSS HARDWARE MODULES

CROSS-REFERENCE TO RELATED APPLICATION

This application claims priority to U.S. Provisional Application 61/900,353, filed Nov. 5, 2013, the complete disclosure of which is incorporated herein by reference in its entirety.

TECHNICAL FIELD

This disclosure relates in general to the field of computer systems and, more particularly, pertains to performing hierarchical routing across hardware modules.

BACKGROUND

The proliferation of electronic communication devices such as laptop computers, tablets, cellular phones, desktop computers, etc. has significantly increased the scale and complexity of computer networks. As the number of devices in networks increase, the task of routing data to and from each of the devices becomes more burdensome. In particular, network complexity can overextend the hardware and software resources responsible for performing network routing.

Many networking platforms utilize modular routing solutions in which the forwarding engine is programmed identically across all of the cards in the different modules. Consequently, the scalability of the network is limited to the table size of a single forwarding engine. In some instances, networks can increase scalability by utilizing techniques associated with virtual routing and forwarding (VRF) and virtual device context (VDC). However, these techniques to improve scalability do not work for all network configurations.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

The subject technology provides embodiments for a system and method for routing data in a computer network. The system including a line card and a fabric module. The line card is configured to receive a data packet and determine, based on a destination address, whether an appropriate route for the data packet is available in a first routing table stored on the line card. In response to determining that the appropriate route is not available, the line card forwards the data packet to the fabric module. The fabric module is configured to receive the data packet and determine, based on the destination address, that the appropriate route for the data packet is available on a second routing table stored on the fabric module.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Figure 1:
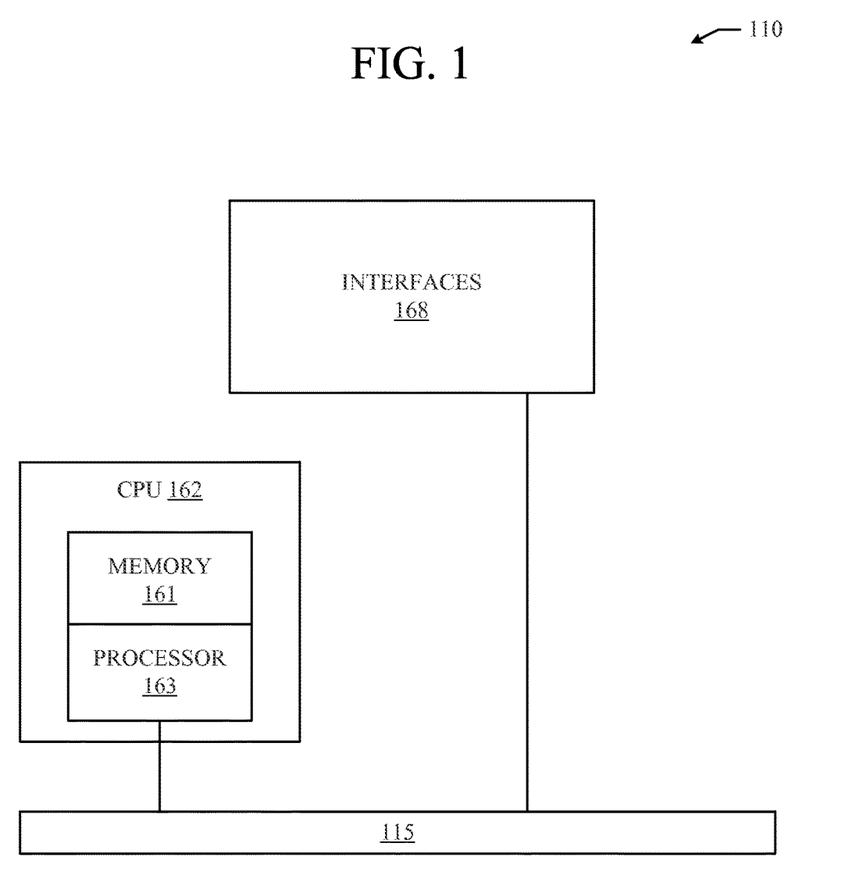
FIG. 1 illustrates an example network device according to some aspects of the subject technology.

The disclosed technology addresses the need in the art for improving the scale of the routing table in computer networks. Disclosed are systems and methods for performing hierarchical routing across hardware modules. A brief introductory description of an exemplary network device and a system, as illustrated in FIG. 1 and FIG. 2 respectively, is disclosed herein. A detailed description of hierarchical routing across hardware modules, and example variations, will then follow. These variations shall be described as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

In one example implementation, network device 110 can include memory 161 for storing routing information to be used in achieving the optimization of network traffic, as discussed herein. Additionally, any of the components described herein may include instances of one or more processors that can execute software or an algorithm to perform the routing functions, as disclosed in this Specification. These devices may further keep information (e.g., variables) in any suitable memory element [e.g., random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term "memory element."

Figure 2A:
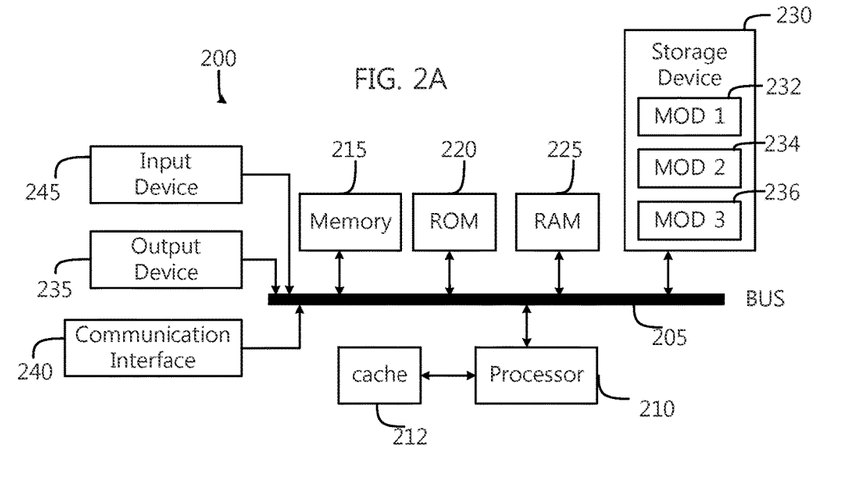
FIGS. 2A and 2B illustrate an example system embodiments according to some aspects of the subject technology.
Figure 2B:
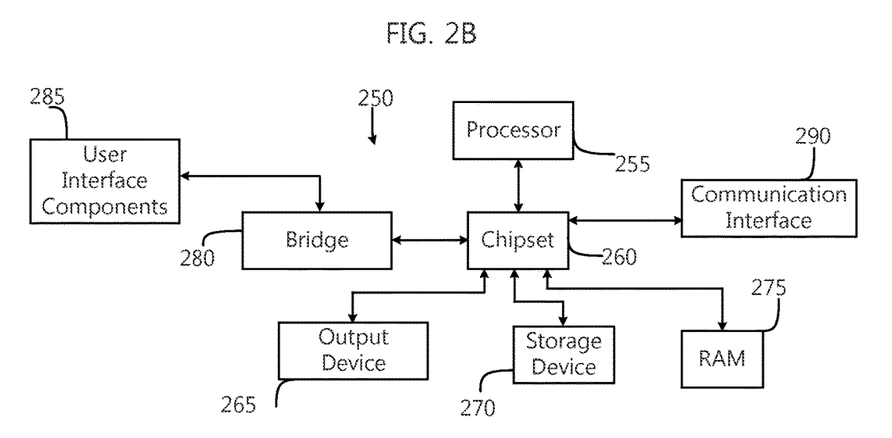

FIG. 2A and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
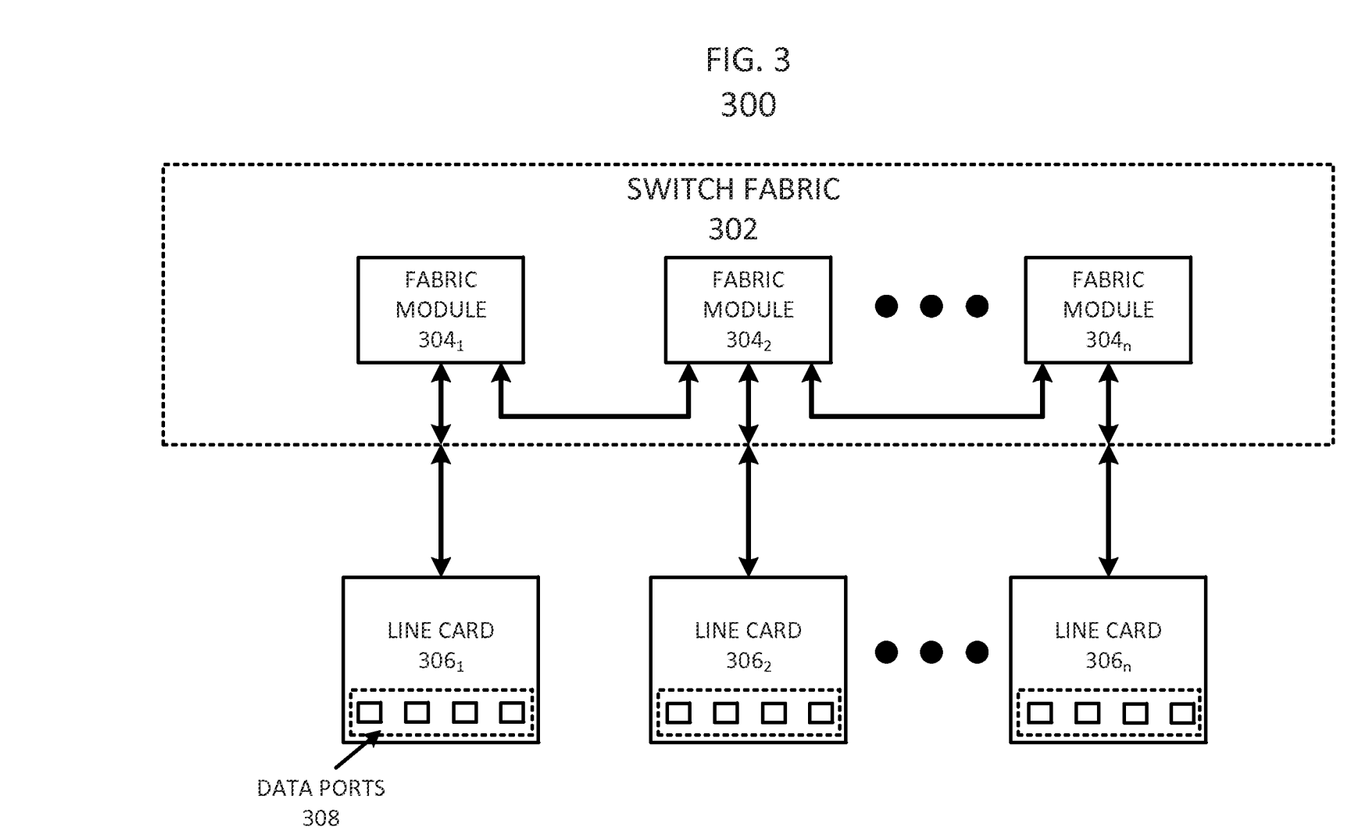
FIG. 3 illustrates a schematic block diagram of an example architecture for a modular networking platform.

FIG. 3 illustrates an example system 300 for routing data in a computer network utilizing the present technology. System 300 is a modular routing platform that includes switch fabric 302 and line cards $306_1$, $306_2$ ... $306_n$ (collectively "306"). Switch fabric 302 includes fabric modules $304_1$, $304_2$ ... $304_n$ (collectively "304"). Each line card $306_i$ can have one or more data ports 308 configured to send and receive data packets to and from the network.

Line cards 306 are communicatively coupled to the switch fabric 302. The fabric modules 304 provide connectivity between each of the line cards 306. For example, a data packet received on an ingress data port of line card $306_1$ may have a destination address that requires it to be routed to an egress data port of line card $306_2$. The data packet can be forwarded from line card $306_1$ to a fabric module $304_i$ in switch fabric 302. The switch fabric 302 will perform the required switching to ensure that the data packet is forwarded to line card $306_2$ where it can be propagated out the appropriate egress port.

In some embodiments, line cards 306 can communicate directly with all of the fabric modules 304 in the switch fabric 302. For example, line card $306_1$ can send a data packet directly to fabric module $304_1$, $304_2$ or $304_n$. Alternatively, a line card $306_i$ can communicate directly with a subset of the fabric modules 304 in the switch fabric 302.

System 300 can perform hierarchical routing across modules by segregating the layer 3 (L3) routing tasks between line card 306 and fabric module 304, thereby increasing the number of routing entries available in the network. For example, the line cards 306 can be programmed with a portion of the routing entries and fabric modules 304 can be programmed with the remaining routing entries. Previous modular routing platform designs rely on the line cards 306 for performing the routing L3 internet protocol (IP) address lookup tasks.

Figure 4:
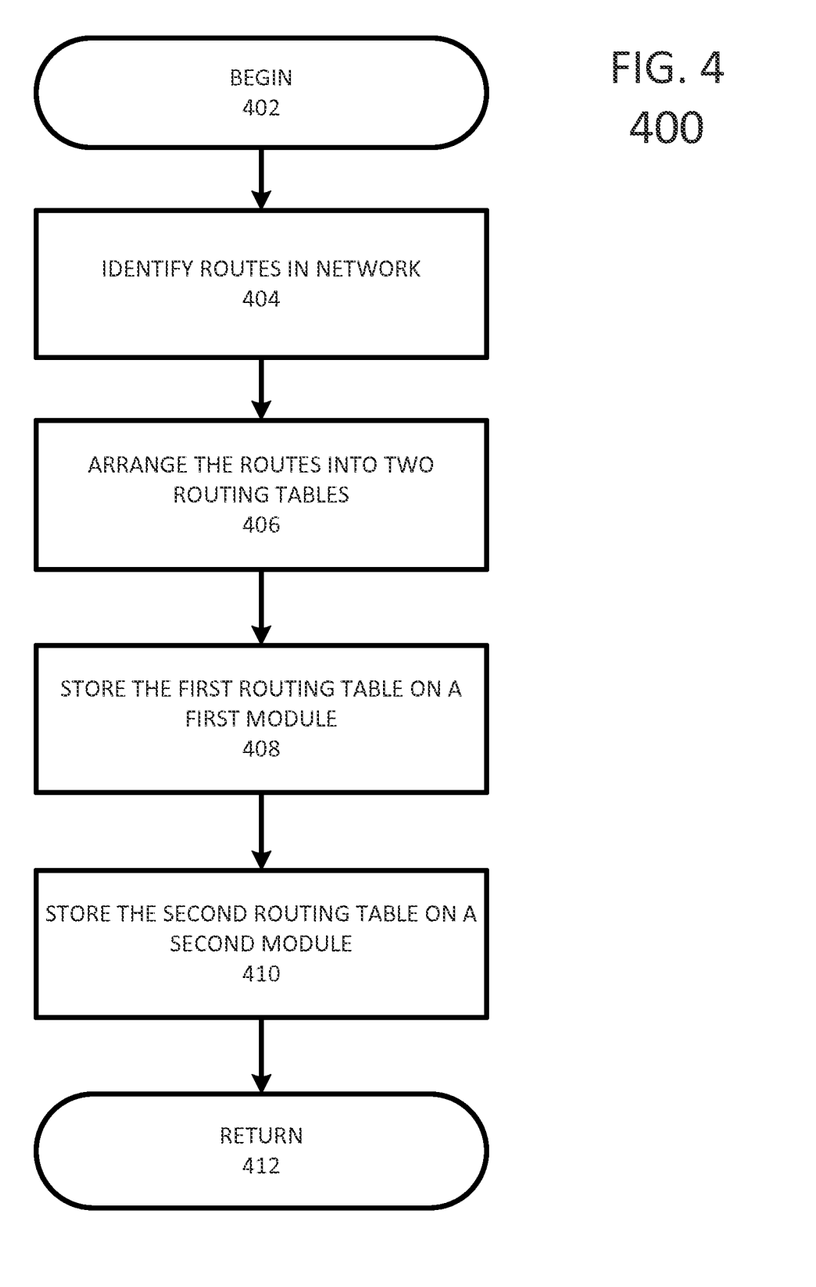
FIG. 4 illustrates an example method embodiment.

Turning now to FIG. 4, an exemplary method 400 for performing hierarchical routing across hardware modules is illustrated. Method 400 begins at step 402 and continues to step 404 in which available routes in the network are identified. In some instances, routes may be identified by a user such as a network operator responsible for configuring the network. Alternatively, a user may configure the system to use routing protocols such as Open Shortest Path First (OSPF) and Routing Information Protocol (RIP). The applicable routing protocol can operate to identify the routes in the network.

After the routes are identified at 404, the method continues to step 406 wherein the routes are arranged into two separate routing tables. In one example, the routes can be arranged according to their corresponding network mask and their address prefix. For instance, a host route that has a /32 mask (255.255.255.255) can be placed at the beginning of the first table and a default route with a /0 mask (0.0.0.0) can be placed at the end of the second table. Routes that have the same network mask can be ordered according to their address prefix with more specific prefixes placed ahead of those that are less specific. Accordingly, the routes can be arranged from the most specific route to the coarsest route.

In some instances, a custom cut-off mask can be used to delineate between the routing tables. For example, a custom cut-off mask of /24 (255.255.255.000) can be used to designate that all routes with masks higher than /24 be stored in a first routing table while the remaining, coarser routes are to be stored in a second routing table. Alternatively, the system can dynamically allocate the available space in the separate routing tables to optimize use of the resources. As new routes are identified, the entries in the routing tables can be shifted to place the new route in its appropriate position. For example, if the mask of the new route dictates that it belongs in the first routing table, the last entry from the first table can be moved to the second table to allocate the space for the new route.

The first routing table can also include a default route that corresponds to the module having the second routing table. As discussed above, the first routing table can contain the most specific routes in the network. However, a data packet that is associated with an address that is not available on the first routing table should not be dropped. Accordingly, the last entry on the first routing table can forward the data packet to a default address corresponding to the module with the complimentary second routing table containing coarser routes.

Once the available routes are arranged into separate routing tables at 406, the method proceeds to step 408. At 408, the first routing table is stored on a first hardware module. In one embodiment, the first hardware module can be a line card 306$_i$ such as the one described as part of system 300. The line card 306$_i$ may be part of a modular routing platform such as a standalone end-of-row switch. Alternatively, the first routing table may be stored on other hardware devices that are configured to direct network traffic such as standalone routers or switches. One that is skilled in the art will appreciate that the present technology can be employed in a number of different configurations.

At step 410, the second routing table is stored on a second hardware module. In one embodiment, the second hardware module can be a fabric module 304$_i$ such as the one described as part of system 300. The fabric module 304i may be part of a modular routing platform such as a standalone end-of-row switch. Alternatively, the second routing table may be stored on other hardware devices that are configured to direct network traffic such as routers or switches. Again, one that is skilled in the art will appreciate that the present technology is not limited to a particular type of hardware.

After step 410, the method 400 continues to step 412 where it returns to previous processing, including repeating method 400.

Figure 5:
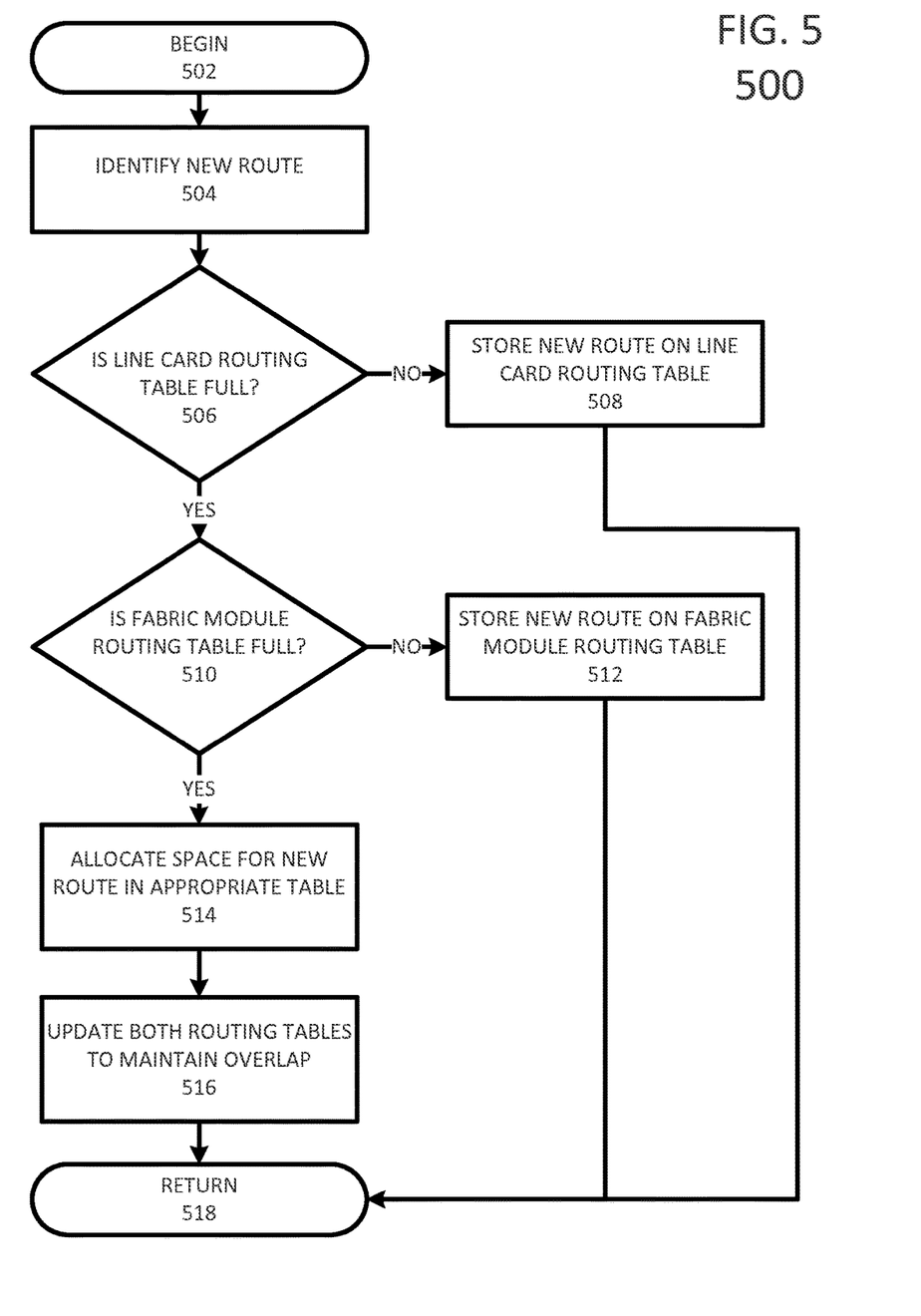
FIG. 5 illustrates an example method embodiment.

Turning now to FIG. 5, another exemplary method 500 for performing hierarchical routing across hardware modules is illustrated. Method 500 begins at step 502 and continues to step 504. At 504, a new network route is identified. As discussed with regard to method 400, network routes may be identified by the network operator or according to a routing protocol that is employed within the system. For example, when a new node is added to a network, the routing protocol can identify new routes to reach that node and can also modify existing routes to utilize the new node, thus routing network traffic more efficiently. Likewise, a particular node in a network may fail or become unavailable; this can result in routing churn as the table is updated to eliminate routes that were making use of that particular node.

After the new route is identified at 504, the method proceeds to step 506 where it determines if the routing table on the line card has available space. If space is available on the line card, the new route can be stored on the line card at step 508. The new route can be stored according to its network mask or its routing prefix, or a combination thereof. For example, the table can be organized such that the most specific routes, such as /32 host routes, are stored at the top or beginning of the table. Consequently, the new route is not simply appended to the end of the table. The existing entries in the table can be shifted to allow the new route to be stored in its appropriate location in order to maintain the table organized from specific to granular routes.

In one embodiment, the line card may utilize a Trident II integrated circuit from BROADCOM. The line card can be configured to manage route table entries using Algorithm Longest Prefix Match (ALPM) wherein it can store a minimum of 128,000 routing entries. Those that are skilled in the art will recognize that other line cards with differing capacity can be utilized with the present technology. Furthermore, a modular platform may contain any number of line cards. Each of the line cards can be programmed with the same routing table. Therefore, when a new route is identified, it can be stored on all of the line cards in order to maintain consistency.

If the routing table on the line card is determined to be full at step 506, the method proceeds to step 510 where it determines if the routing table on the fabric module has available space. If space is available on the fabric module, the new route can be stored on the fabric module at step 512. In one embodiment, the fabric module may also utilize a Trident II integrated circuit from BROADCOM. The fabric module can be configured to manage route table entries using ALPM, wherein it can store at least 128,000 routing entries. These routing entries are in addition to those that are stored on the line card. Therefore, configuring the system in this manner can allow for double the capacity of L3 routes. Furthermore, the routing table on the fabric module can be organized similarly to the one in the line card. That is, the routing table can proceed from more specific routes to more granular routes. In some embodiments, the routing table on the line card may contain a default /0 route at the end of the table to prevent a packet from being dropped.

Figure 6A:
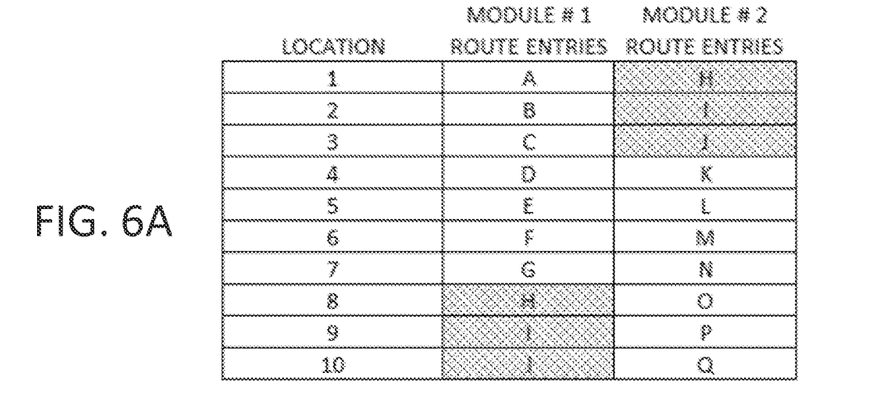
FIGS. 6A, 6B, and 6C illustrate routing table entries according to some aspects of the subject technology.
Figure 6B:
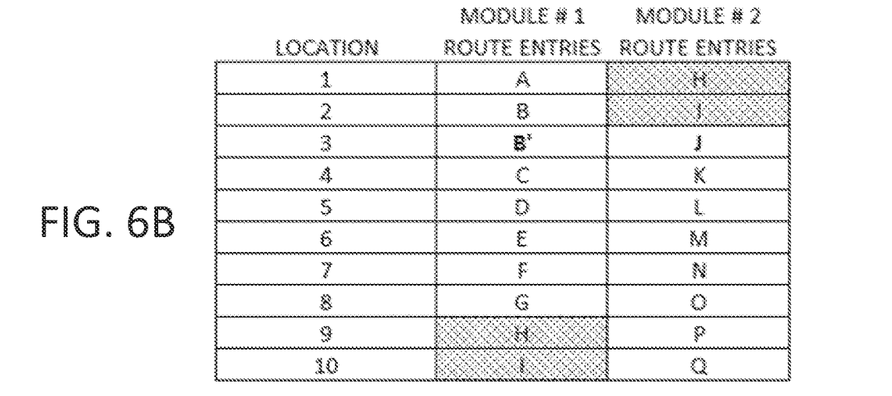
Figure 6C:
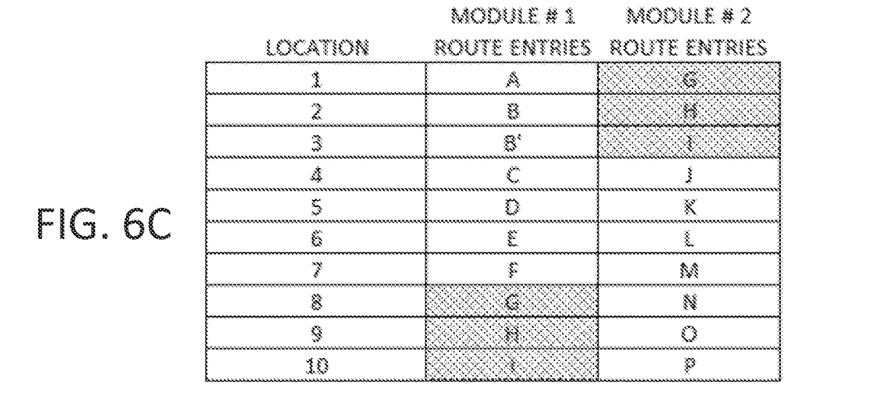

If the routing table on the fabric module is determined to be full at step 510, the method proceeds to step 514 wherein it allocates space for the new route on the appropriate table. FIGS. 6A, 6B, and 6C illustrate how space can be allocated for a new route. FIG. 6A shows examples of two simplified routing tables stored on two different modules. In order to easily explain the concept, these tables only contain 10 routing entries. As determined by steps 506 and 510, the new route cannot merely be added because each of the tables is full. The first table contains routing entries A through J and the second routing table contains entries H through Q.

The shaded cells in each of the tables indicate that there is some redundancy in the entries. Here, three of the routes (H, I, J) are duplicated in both tables. This redundancy avoids a potential race condition that might occur when adding new routes. For example, the routing mask of a new route B' may indicate that it belongs on the first routing table between entries B and C. In order to make space for this route, the last entry from the first table (J) needs to be dropped. FIG. 6B shows the status of the routing tables after the new entry B' is added to the first routing table. Although route J has been dropped from the first table, it is still present on the second table. Therefore, a packet that arrives which requires route J will not be dropped. Instead, after the first module is unable to find an appropriate route on the first module's table, the packet will be forwarded to the second module. At the second module, the routing lookup will be successful and get a "hit" when it reaches the entry for route J.

After the space is allocated for the new route, the method proceeds to step 516 where it updates the tables to maintain the appropriate safety overlap. Turning back to FIG. 6B, the overlap is reduced to two entries (H, I) after the new route B' is added to the first routing table. Consequently, if three additional new routes were added to the first table, the overlap would be lost entirely and the system might be vulnerable to dropping packets that come in during this time. To avoid this, the overlap is restored as illustrated in FIG. 6C. The last route from the second routing table (Q) is dropped so that all of the entries can be shifted to make room for route G at the top of the second module's table. After this is done, each of the tables once again shares 3 routes (G, H, I).

The overlap of three routes in FIG. 6C is shown for simplicity. The number of overlapping routes can be as large as needed to account for expected route churn in the particular system. For example, the overlap can be determined according to the number of routes that are outstanding between the Unicast Forwarding Distribution Module (UFDM) and the forwarding information base (FIB). In some examples, the number of outstanding routes at a particular time is approximately 125. To ensure there is sufficient redundancy for all situations, the safety overlap can be set to four times the outstanding routes, or in this case it can be set to 500 routes. Accordingly, the last 500 routes of the table on the first module (i.e. line card) can be duplicated on the second module (i.e. fabric card) to avoid dropped packets.

Furthermore, as explained above, the last entry in each of the tables can provide for a default route. These default routes are not illustrated in FIGS. 6A, 6B, and 6C. However, the last entry of the table on the first module should be a default route that sends the data packet to the second module. Accordingly, this entry should be kept consistent when adding and removing routes from the table. Likewise, the last of the table in the second module can be set as a default /0 route. The default route can be used to avoid dropping data packets that do not match any of the entries in either of the two routing tables. Alternatively, a network administrator may choose to omit the default route at the end of the second routing table and allow those packets to be dropped.

After the routing tables are updated to maintain the desired level of overlap at step 516, the method proceeds to step 518 where it returns to previous processing, which includes repeating method 500.

Figure 7:
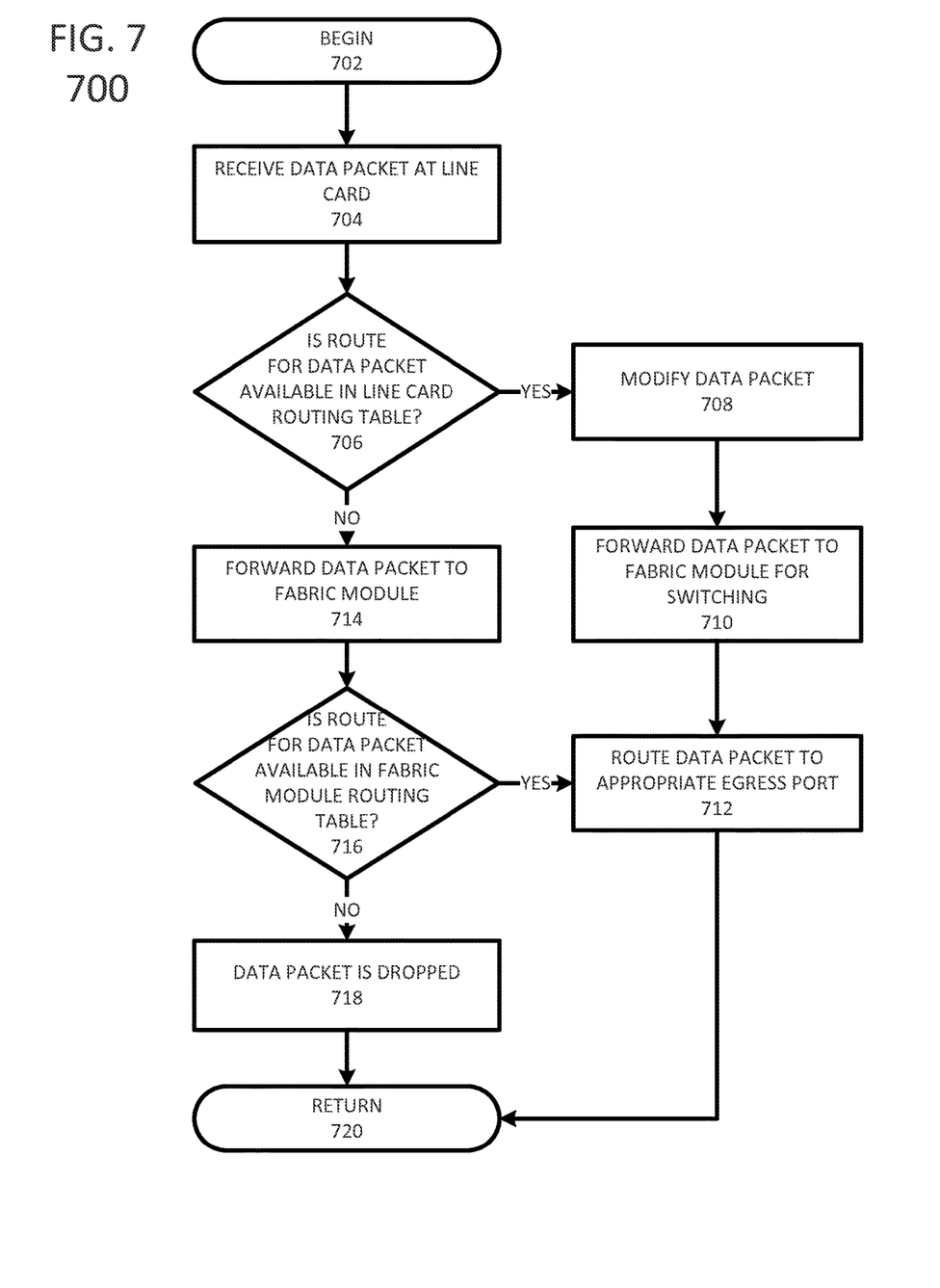
FIG. 7 illustrates an example method embodiment.

Turning now to FIG. 7, another exemplary method 700 for performing hierarchical routing across hardware modules is illustrated. Method 700 illustrates the flow of a data packet within a system that uses the present technology. Method 700 begins at step 702 and continues to step 704. At 704, a data packet is received at a line card. The data packet can be associated with a destination IP address and require a layer 3 routing lookup in order to be routed to the appropriate an appropriate egress port.

At step 706, the line card can determine if an appropriate route is available for the data packet's destination IP address on the line card's routing table. The routing table can be organized with routes having more specific routing masks and prefixes arranged ahead of routes that are less specific. Accordingly, the first match or "hit" that is found in the routing table will presumably provide the best path for routing the data packet.

If an appropriate L3 route is found on the line card's routing table, the method proceeds to step 708 where it modifies the data packet for routing using layer 2 (L2) protocol. The data packet is encapsulated using a switching media access control (MAC) address and forwarded to the fabric module using L2 protocol at 710. In turn, the fabric module can receive the L2 data packet and immediately send it to the appropriate egress port, without the need of additional routing lookup.

However, if an appropriate L3 route is not found on the line card's routing table at step 706, the data packet is forwarded to the fabric module at step 714. This forwarding occurs according to the default route on the line card's routing table. The data packet can be forwarded to any of the fabric modules because they all contain the same routing table that compliments the one that is stored on the line card. In some embodiments, the line card can selectively forward data packets to particular fabric modules as a way of balancing the network traffic. For example if there are two fabric modules, the line card can alternate sending data packets to each of the two fabric modules.

Once the data packet arrives at the fabric module, it can determine at step 716 if an appropriate route is available for the data packet's destination IP address on the fabric module's routing table. The fabric module's routing table is populated with the balance of the routes that are available in the network. Here, the routes once again are stored from the more specific to the coarser, according to the network mask and address prefix.

If an appropriate route is found on the fabric module, the data packet is encapsulated and sent to the appropriate egress port at step 712. In some embodiments, the appropriate route may consist of a /0 default route that is included at the end of the routing table to avoid dropping data packets that are associated with an IP address that did not have a match in either of the two routing table.

Alternatively, if none of the routes in the fabric module's routing table match the destination IP address and the table does not include a /0 default route, then the data packet is dropped at step 718. After the data packet is routed at 712 or dropped at 718, the method 700 continues to step 720 where it returns to previous processing, which includes repeating method 700.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is also important to note that the steps for optimization and/or placement described herein illustrate only some of the possible signaling scenarios and patterns that may be executed by a computing system. Some of these steps may be deleted or removed where appropriate, or these steps may be modified or changed considerably without departing from the scope of the present disclosure. In addition, a number of these steps have been described as being executed concurrently with, or in parallel to, one or more additional operations. However, the timing of these steps may be altered considerably. The preceding operational flows have been offered for purposes of example and discussion.

Although the present disclosure has been described in detail with reference to particular arrangements and configurations, these example configurations and arrangements may be changed significantly without departing from the scope of the present disclosure. For example, although the present disclosure has been described with reference to data centers, it may be applicable to other computing systems and architectures.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system for routing data in a computer network, the system comprising:
    a line card having a first processor configured to:
        receive a data packet having a destination address;
        determine, based on the destination address, whether an appropriate route for the data packet is available in a first routing table stored on the line card; and
        in response to determining that the appropriate route is not available in the first routing table, forward the data packet to a fabric module, and wherein the line card is further configured to balance network traffic by selectively forwarding one or more data packets to the fabric module or to a second fabric module;
    the fabric module having a second processor configured to:
        receive the data packet from the line card;
        determine, based on the destination address, that the appropriate route for the data packet is available in a second routing table stored on the fabric module, wherein the second routing table only comprises a remaining balance of network routes that are not available on the first routing table; and
        forward the data packet to the destination address according to the appropriate route.

2. The system of claim 1, wherein if the line card determines that the appropriate route is available in the first routing table, the line card is further configured to:
    modify the data packet to include a proper egress port; and
    forward the modified data packet to the fabric module for switching to the proper egress port.

3. The system of claim 1, wherein a first plurality of network route entries are stored on the first routing table and a second plurality of network route entries are stored on the second routing table.

4. The system of claim 3, wherein the first plurality of network route entries and the second plurality of network route entries are organized according to a network mask.

5. The system of claim 4, wherein a portion of the first plurality of network route entries stored at an end of the first routing table is duplicated at a start of the second routing table.

6. The system of claim 4, wherein the second routing table is a complimentary routing table.

7. The system of claim 4, wherein each of the plurality of routes are stored in only one of the first routing table or the second routing table based on route type.

8. The system of claim 7, wherein the route type is designated via a mask.

9. The system of claim 1, wherein the fabric module is further configured to:
    determine, based on the destination address, that the appropriate route for the data packet is not available in the second routing table; and
    forward the data packet to a default route to avoid dropping the data packet.

10. A computer-implemented method for configuring a computer network, the method comprising:
    identifying, via a processor, a plurality of routes in the computer network;
    arranging a first portion of the plurality of routes in a first routing table and a second portion of the plurality of routes in a second routing table so each of the plurality of routes are stored in only one of the first routing table or the second routing table, wherein the combined total of the first portion of the plurality of routes and the second portion of the plurality of routes comprises all network routes available in the computer network;

storing the first routing table on a first module configured to look up routes for incoming data packets, and wherein the first module is further configured to balance network traffic by selectively forwarding one or more data packets to a second module selected from among two or more other modules, wherein the first module is a network line card and the two or more other modules are network fabric modules in a system; and storing the second routing table on the second module configured to receive and route each of the data packets that could not be routed by the first module.

11. The computer-implemented method of claim 10, wherein a first route in the first routing table corresponds to a host route and a last route in the second routing table corresponds to a default route.

12. The computer-implemented method of claim 10, wherein the first portion of the plurality of routes have a network mask that is more specific than a cut-off mask.

13. The computer-implemented method of claim 10, wherein each of the plurality of routes comprises a network mask and an address prefix, and wherein the arranging orders the plurality of routes from specific routes to coarse routes according first to the network mask and second to the address prefix.

14. The computer-implemented method of claim 13, wherein the first routing table and the second routing table have a number of shared routes corresponding to routes located at an end of the first routing table that are replicated at a start of the second routing table.

15. The computer-implemented method of claim 14, further comprising:

inserting a plurality of new routes in the first routing table, wherein the plurality of new routes is less than or equal to the number of shared routes.

16. The computer-implemented method of claim 10, wherein each of the plurality of routes are stored based on route type.

17. The computer-implemented method of claim 16, wherein the route type is designated via a mask.

18. The computer-implemented method of claim 10, wherein the second routing table is a complimentary routing table.

* * * * *